RADIO-PHONOGRAPH COMBINATION

Filed April 21, 1953

INVENTORS
WILLIAM BLINOFF.
LEONARD E. PEARSON.
FRED. P. VENDITTI.

BY

ATTY.

2,836,663

RADIO-PHONOGRAPH COMBINATION

William Blinoff, Prospect Heights, Leonard E. Pearson, La Grange, and Fred P. Venditti, Lisle, Ill., assignors to Motorola, Inc., Chicago, Ill., a corporation of Illinois Application April 21, 1953, Serial No. 350,022

11 Claims. (Cl. 179—100.11)

The present invention relates broadly to modulating and control systems, and more particularly to an improved radio-phonograph combination.

Radio-phonograph combinations of many types are well known to the art and comprise basically a radio receiver which includes switching means for connecting a phonograph pickup into the receiver circuit so that various stages of the receiver may be used for amplifying the phonograph signals. In such combinations, the use of the capacitive type of pickup cartridge is preferred since such cartridges can usually be manufactured more inexpensively than other types. However, most radio-phonograph combinations using capacitive pickups employ the frequency modulation principle. That is, an oscillator is frequency modulated by the capacity pickup and a discriminator detector used to reproduce the intelligence.

The above type of frequency-modulation arrangement is not readily usable with amplitude modulation receivers and it is, accordingly, an object of the present invention to provide a low-cost amplitude modulation superheterodyne radio receiver-phonograph combination that utilizes an inexpensive capacity pickup cartridge for phonograph reproduction.

A further object of the invention is to provide an improved radio-phonograph combination which is capable of reproducing amplitude modulated radio signals and which incorporates an exceedingly simple, improved and inexpensive system for enabling the receiver to be used for phonograph reproduction.

A further object of the invention is to provide such an improved combination which may be conditioned for radio or phonograph reproduction by the use of an extremely simple network and switching mechanism.

Yet another object of the invention is to provide such an improved combination in which the effects of hum or other disturbances during phonograph reproduction are reduced to a minimum.

A still further object of the invention is to provide such an improved combination in which amplitude wow due to record eccentricities is compensated for all practical purposes.

A more general object of the invention is to provide an improved system in which a capacitive element is utilized to amplitude modulate a selected signal.

Another general object of the invention is to provide an improved system which incorporates a variable capacitive element and which is capable of producing a signal having an amplitude which is a function of the capacity of such element.

A feature of the present invention is the provision of a system in which the coupling coefficient between a pair of inductance coils is controlled by a capacitive element in such a manner that the amplitude of the signal induced in one of the inductance coils in response to a signal impressed across the other is a function of the capacity of the capacitive element.

Another feature of the present invention is the provision of an amplitude modulation radio receiver of the superheterodyne type in which the converter stage may be conditioned to supply an intermediate frequency signal to the intermediate frequency amplifier for phonograph reproduction, and in which a capacity pickup is bridged across one of the intermediate frequency transformers to vary the coupling coefficient thereof in accordance with capacity variation of the pickup and thereby amplitude modulate the aforesaid intermediate frequency signal.

A further feature of the invention is the provision of an improved radio-phonograph combination in which a capacity pickup is used to control the coupling coefficient of a transformer and in which an automatic gain control circuit is used to compensate the effects of record eccentricities to obviate undesirable wow during phonograph reproduction.

Yet another feature of the invention is the provision of such a combination in which the capacity pickup is selectively bridged across the transformer by means of a single-pole double-throw switch, which switch also increases the sensitivity of the receiver to automatic gain control action during phonograph reproduction for increased wow compensation, and which also reduces the carrier amplitude supplied to the intermediate frequency amplifier to decrease hum.

Another feature of the invention is the provision of a radio-phonograph combination in which the converter stage of a superheterodyne receiver is selectively conditioned in an improved and simplified manner to generate an intermediate frequency signal for utilization in phonograph reproduction.

A still further feature of the invention is the provision of improved apparatus in which a capacitive modulating element is bridged across a transformer to vary its coupling coefficient and amplitude modulate a selected signal impressed on the transformer.

The above and other features of the invention which are believed to be new are set forth with particularly in the appended claims. The invention itself, however, together with further objects and advantages thereof, may best be understood by reference to the following description when taken in conjunction with the accompanying drawings in which:

The present invention provides a signal translating system which comprises basically a means for producing a signal, and a circuit for utilizing that signal. A pair of inductance coils is provided for supplying the aforementioned signal to the utilization circuit, and a capacitive modulation element is bridged across the inductance coils to vary the coupling coefficient therebetween and control the amplitude of the aforesaid signal as applied to the utilization circuit in accordance with capacity variation of the element.

Figure 1:
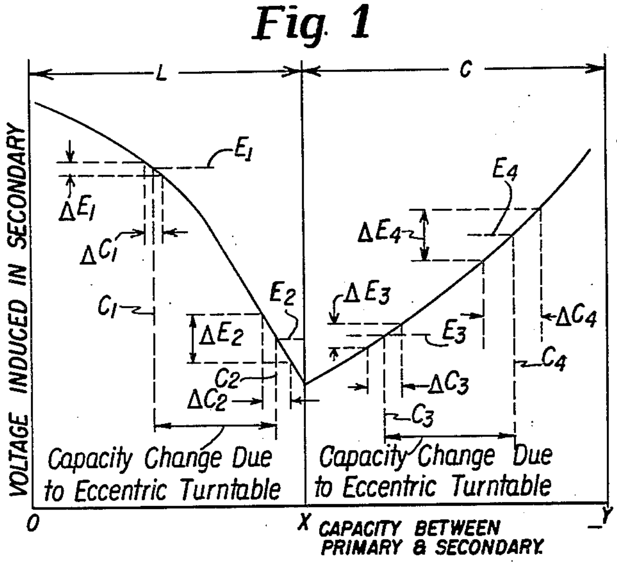
Fig. 1 is a curve useful in explaining a feature of the invention.

The curve of Fig. 1 shows the effect of a capacity bridged across a transformer on the amplitude of the signal induced in the secondary winding of the transformer by a selected signal impressed across the primary. The transformer may constitute an intermediate-frequency coupler in a radio receiver, and in radio receivers the primary and secondary windings of the intermediate frequency transformers are sometimes coupled in a capacitive bucking sense so that under normal conditions the capacity between the two windings is a minimum and maximum voltage is induced in the secondary by inductive coupling in response to the aforementioned signal applied to the primary winding.

When a capacity is bridged across the primary and secondary windings, it cancels a portion of the mutual inductance and decreases the amplitude of the signal across the secondary. As this capacity is increased from zero to a value X, more and more of the mutual inductance is cancelled and the amplitude of the signal in the secondary winding decreases from a maximum to a minimum value. Any increase in the capacity beyond the value X provides resultant capacitive coupling between the two windings, the inductive coupling being entirely cancelled, and the amplitude of the signal in the secondary again rises as the capacity is increased from value X to value Y. The region between zero and X capacity of some resultant inductive coupling is designated L in Fig. 1, and the region between X and Y capacity in which the inductive coupling is cancelled and the resultant coupling is capacitive is designated C.

Assume now that a capacity pickup is bridged across the primary and secondary windings which has a relatively low mean capacity $C_1$. When such a capacity pickup is used in conjunction with a phonograph record, its capacity value varies $\Delta C_1$ due to record modulations causing amplitude modulations of value $\Delta E_1$ on the signal $E_1$ in the secondary winding. Therefore, by the use of such a capacitive pickup, the signal induced in the secondary of the transformer may be amplitude modulated in an extremely simple manner.

A problem often encountered in the phonograph art is the compensation of "wow" which is caused by eccentricities in the mounting of the phonograph record. When the turntable is not truly centered, each revolution thereof causes the mean capacity of the capacity pickup to vary from the aforementioned value $C_1$ to a value $C_2$ greater than $C_1$. When the capacity pickup has a value $C_2$, variations in its capacity $\Delta C_2$ due to the record grooves are greater than the variation $\Delta C_1$ due to the increased mean capacity. The variations $\Delta C_2$ produce amplitude modulations $\Delta E_2$ on the aforementioned signal which is greater than the previous amplitude modulation $\Delta E_1$. Therefore, as the turntable rotates, the unmodulated amplitude of the signal in the secondary winding varies from a value $E_1$ to a lower value $E_2$, and at the same time the amplitude of the modulation on this signal varies from a relatively low value $\Delta E_1$ to a greater value $\Delta E_2$. As the carrier amplitude of the signal falls from $E_1$ to $E_2$, the automatic gain control (AGC) circuit of the receiver tends to increase the gain of the receiver, but this occurs at the very time that the amplitude of the modulation increases from $\Delta E_1$ to $\Delta E_2$. Therefore, the automatic gain control aggravates the condition by increasing the gain at the receiver at the very time when the amplitude of the modulation has increased. Under some conditions, when the turntable is not accurately centered, this can produce noticeable wow in the output of the receiver.

In order to overcome the conditions described above, a capacity pickup may be used whose mean capacity is sufficient to overcome the mutual inductance of the transformer completely so as to operate in the C region of Fig. 1. Assuming that such a pickup has a capacity $C_3$, capacity variation $\Delta C_3$ due to the record grooves produces an amplitude modulation $\Delta E_3$ on the signal in the secondary winding. Now, should record eccentricities cause the mean value of the capacity pickup to vary from $C_3$ to a greater value $C_4$, the increased variation $\Delta C_4$ due to record grooves at the latter value causes an increased amplitude modulation $\Delta E_4$ on the aforementioned signal. Therefore, in the latter condition, the amplitude modulation increases from $\Delta E_3$ to $\Delta E_4$ and, at the same time, the carrier amplitude increases from $E_3$ to $E_4$. In this instance, the carrier increase causes the AGC of the receiver to reduce the gain thereof at the precise time that the amplitude modulation is increasing so that the tendency for wow is compensated and eliminated for all practical purposes.

The reason that $\Delta E_2$ is greater than $\Delta E_1$ is that when the mean capacity of the pickup increases due to record eccentricities, the effective capacity variation therein due to a certain mechanical shift in the vane of the pickup in response, for example, to the record grooves increases correspondingly so that $\Delta C_2$ is greater than $\Delta C_1$. For the same reason, $\Delta C_4$ is greater than $\Delta C_3$.

Figure 2:
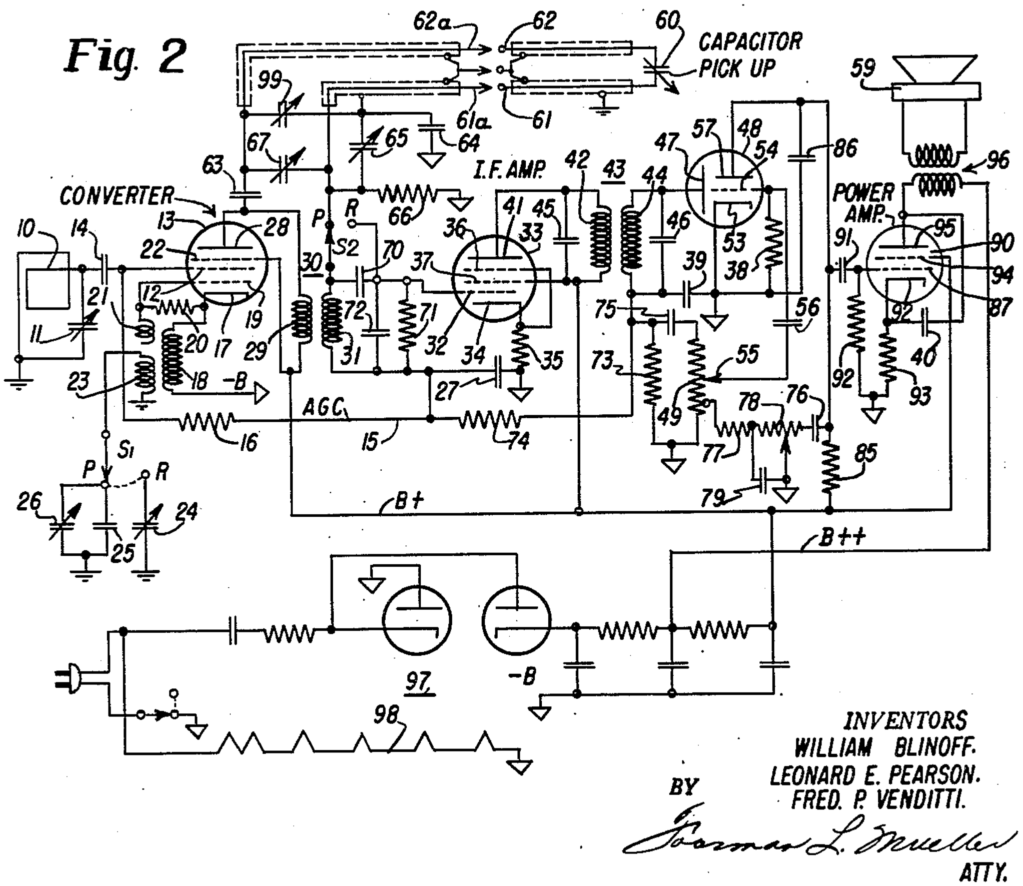
Fig. 2 is a superheterodyne radio-phonograph combination constructed in accordance with the invention.

The above discussed principles of the invention are utilized in the receiver of Fig. 2, and it is to be understood that the system can be constructed either to operate in the L region of Fig. 1, or in the C region, depending upon whether wow compensation is required or not. Moreover, when operating in the C region, it is not necessary that the two coils be inductively coupled and it is feasible to provide a pair of isolated inductance coils whose sole coupling is constituted by capacitive means including the capacitive pickup, the latter being varied to provide the aforediscussed amplitude variation in the signal induced in the secondary in response to a signal in the primary.

The radio receiver of Fig. 2 is a typical low-cost amplitude modulation superheterodyne receiver which has been conditioned for phonograph reproduction in accordance with the teachings of the present invention. The receiver includes a loop antenna 10 and a variable tuning capacitor 11 connected across the antenna circuit and having one side connected to a point of reference potential which is usually the chassis of the receiver. The other side of capacitor 11 is coupled through a capacitor 14 to the control electrode 12 of an electron discharge device 13 which may be of the type presently marketed under the symbol 12BE6 and which constitutes the converter stage of the receiver. The control electrode 12 is connected to the automatic gain control (AGC) lead 15 of the receiver through a grid-leak resistor 16.

Discharge device 13 has a cathode 17 connected to B− through an inductance coil 18, and the device has a further control electrode 19 which is connected to cathode 17 through a grid-leak resistor 20. Control electrode 19 is also connected to a coil 21 which is capacitively coupled to coil 23. Device 13 also includes a screen electrode 22 which is connected to B+. Electrodes 17, 19 and 22 of discharge device 13 constitute the heterodyne oscillator section of the device and, to complete the oscillator circuit, a resonant network is provided including an inductance coil 23 shunted by a variable capacitor 24 when switch $S_1$ is in the "R" position for radio reproduction. Inductance coils 18 and 23 are inductively coupled one to the other and, as previously noted, coil 21 is capacitively coupled to coil 23. For phonograph reproduction, switch $S_1$ is placed in the "P" position to shunt a capacitor 25 and trimmer 26 which constitute an impedance element across coil 23 and cause the oscillator to be tuned to the intermediate frequency of the receiver.

Discharge device 13 has an anode 28 connected to B+ through the primary winding 29 of an intermediate frequency transformer 30. Primary winding 29 of transformer 30 is inductively coupled to secondary winding 31 of the transformer, preferably in a capacity bucking relation to reduce the inherent capacitive coupling between the windings to a minimum.

One side of winding 31 is coupled to the control electrode 32 of an electron discharge device 33 through a capacitor 70, and control electrode 32 is connected to the other side of winding 31 through a resistor 71 shunted by a capacitor 72, and the side of resistor 71 remote from control electrode 32 is connected to AGC lead 15 and is bypassed to B− through a capacitor 27. Device 33 constitutes the intermediate frequency amplifier of the receiver and may be the type presently designated as a 12BA6.

Discharge device 33 also has a cathode 34 connected to B— through a cathode resistor 35 and has a suppressor electrode 36 connected to cathode 34. The screen electrode 37 of discharge device 33 is connected to B+, and the anode 41 of this device is coupled to B+ through the primary winding 42 of a second intermediate frequency transformer 43, the primary winding being shunted by a capacitor 45 and tuned thereby to the intermediate frequency of the receiver.

Winding 42 of transformer 43 is inductively coupled to the secondary winding 44, and the latter winding is shunted by a capacitor 46 which tunes it to the intermediate frequency. One side of winding 44 is connected to the anode 47 of an electron discharge device 48 which may be of the type presently marketed under the symbol 12AT6 and which constitutes a detector-amplifier of the receiver. The other side of winding 44 is connected to B— through a detector load resistor 73, and the junction between resistor 73 and winding 44 is connected to AGC lead 15 through a resistor 74. Resistor 73 has a volume control resistor 49 and a series-connected capacitor 75 shunted thereacross.

Discharge device 48 has a cathode 53 connected to B— and has a control electrode 54 which is coupled to a movable tap 55 on volume control resistor 49 through a coupling capacitor 56, the control electrode being connected to B— through a grid-leak resistor 38.

The anode 57 of discharge device 48 is connected to B+ through a load resistor 85, and is bypassed to B— through a capacitor 86. The anode is also coupled to a tap on volume control resistor 49 through a capacitor 76 and a pair of series-connected resistors 77 and 78, resistor 78 having a movable tone control tap thereon connected to B—, and the junction of resistors 77 and 78 being coupled to B— through a capacitor 79. The junction of capacitor 46 and resistor 73 is also connected to B— through a capacitor 39.

Anode 57 is coupled to the control electrode 87 of an electron discharge device 90 through a coupling capacitor 91, the control electrode being connected to B— through a grid-leak resistor 92. Discharge device 90 constitutes the power amplifier of the receiver and may, for example, be of the type presently designated as a 35L6. Device 90 has a cathode 92 connected to B— through a cathode resistor 93, and has a screen electrode 94 connected to B+. The anode 95 of discharge device 90 is connected to B++ through the primary winding of an output transformer 96, and is coupled to cathode 92 through a capacitor 40. The primary of output transformer 96 is coupled to the secondary winding thereof which is connected to a sound reproducing device or speaker 59.

The receiver includes a well-known type of power supply designated generally as 97 which supplies a positive potential B+ and a higher positive potential B++ to the receiver, and the various filaments of the discharge devices are connected in a string 98 between one side of the power line and B—.

In accordance with the present invention, a capacity pickup may be connected to bridge either transformer 30 or transformer 43 and, in Fig. 2, it is shown as bridging transformer 30. The arrangement includes a tone arm including a capacity pickup cartridge 60 (shown schematically) having a pair of shielded leads 61 and 62 extending from the cartridge within the tone arm with their shields connected to a ground point. Lead 61 is connected to a shielded lead *61a* from the receiver through an appropriate terminal connection. Lead *61a* is connected to the P terminal of a switch S2, the switch having its common terminal connected to the upper side of winding 31 of transformer 30. Lead 62 is connected through the aforementioned terminal connection to a shielded lead *62a* from the receiver, and the latter lead is coupled to winding 29 through a blocking capacitor 63. The shield of lead *62a* is connected to the shield of lead *61a* and these shields are coupled to B— through a by-pass capacitor 64. Terminal P of switch S2 is coupled to the common junction of capacitor 64 and the last-mentioned shields through a trimmer capacitor 65, and is connected to B— through a resistor 66. Shielded leads 61 and 62 exhibit capacity in association with the corresponding shield so that they contribute to the tuning of windings 29 and 31. Switch S2 has a second contact R for radio reception which is connected directly to control electrode 32 of device 33. A plate trimmer condenser 99 is coupled between leads 62*a* and the junction of capacitor 64 and 65, and a capacitor 67 is provided effectively bridging transformer 30 to provide additional capacity so that the optimum operating point in Fig. 1, either on the L or C side of the curve may be obtained.

For radio reception, switches $S_1$ and $S_2$ (which may be mechanically intercoupled for uni-control) are placed at their respective contacts "R." With the switches in this position, capacitor 24 is shunted across inductance coil 23 and is adjusted, in conjunction with capacitor 11, in well-known manner to tune the receiver to various selected radio signals in a predetermined frequency band intercepted by antenna 10. The oscillator section of the converter is tuned to supply, in each instance, a heterodyne signal of appropriate frequency for the selected radio signal so that such radio signal is heterodyned to the selected intermediate frequency of the receiver.

The primary winding 29 of transformer 30 is tuned to the intermediate frequency by the capacity of shielded lead *62a* which is shunted by capacitor 99 for trimming purposes. Moreover, since switch $S_1$ is in its "R" position, winding 31 is shunted by capacitor 72 which tunes it to the intermediate frequency, the capacity pickup 60 and its associated circuitry being switched out of the circuit. Therefore, the intermediate frequency signal from the converter corresponding to the selected radio signal is translated by transformer 30 to intermediate frequency amplifier 33.

The intermediate frequency amplifier 33 amplifies the intermediate frequency signal and applies the signal to detector-amplifier 48 through transformer 43. The detector-amplifier is of the well-known amplitude modulation type and detects the amplitude modulations of the intermediate frequency signal, amplifies the resulting audio signal to an extent determined by the setting of tap 55 on volume control resistor 49, and supplies the amplified audio signal to power amplifier 90. The signal is further amplified in the power amplifier and applied to sound reproducing device 59. Network 76—79 constitutes a well-known tone control which may be omitted if so desired.

The detector-amplifier also develops an automatic gain control signal across resistor 73 which is supplied to lead 15 through resistor 74 to control automatically the gain of discharge devices 13 and 33. Lead 15 is connected to the lower side of grid-leak resistor 16 in the converter stage and, when switch $S_2$ is in its "R" position, supplies AGC potential to control electrode 32 of device 33 through resistor 71.

When, on the other hand, switches $S_1$ and $S_2$ are placed in their respective "P" positions for phonograph reproduction, capacitor 25 and its trimmer 26 are shunted across inductance coil 23 to constitute a resonant network tuned to the selected intermediate frequency of the receiver so that an intermediate frequency signal is developed in the converter and impressed on primary winding 29 of transformer 30.

When switch $S_2$ is in its "P" position, a direct connection is made to lead *61a*, so that the capacity pickup 60 is bridged across windings 29 and 31. Capacitor 63 merely functions as a blocking condenser to keep B+ from the pick-up. In addition, when $S_2$ is in its "P" position it no longer short circuits capacitor 70, and capacitors 70 and 72 together shunt winding 31. The junction of these capacitors is connected to control electrode 32 of intermediate frequency amplifier 33, so that they form a potential divider and reduced carrier amplitude is impressed on the intermediate frequency amplifier to provide a substantial hum reduction. Moreover, the latter position of switch $S_2$ connects resistor 66 in shunt with AGC lead 15 decreasing the negative AGC voltage and increasing the gain of discharge devices 13 and 33. This renders these devices more susceptible to the AGC action and provides even more efficient wow compensation in accordance with the previously discussed teachings herein.

Resistor 66 also shunts winding 31 when switch $S_2$ is in its "P" position to provide increased bandwidth for transformer 30 for phonograph reproduction. During such reproduction, the primary winding 29 of transformer 30 is tuned to the intermediate frequency (as in the case of radio reception) by the capacity of lead 62*a*; and the secondary winding 31 is tuned to the intermediated frequency by capacitors 70 and 72 in series, and by the distributed capacity of lead 61*a* shunted by trimmer 65. It is to be noted that since capacitor 72 alone tunes winding 31 to the intermediate frequency for radio reception; and capacitors 71 and 72 are connected thereacross for phonograph reproduction, the additional capacity of lead 61*a* during the latter reproduction acts to tune the secondary back in the direction of the intermediate frequency, and by a small adjustment of trimmer 65 the secondary may be tuned precisely to the intermediate frequency. Thus, the primary and secondary windings of transformer 30 remain tuned to the intermediate frequency, both for radio and phonograph reproduction. It is also to be noted that capacitors 70 and 72 can be conveniently constructed into the base of transformer 30 in accordance with known practice to decrease the cost and space required thereby.

Therefore, transformer 30 for phonograph reproduction supplies an intermediate frequency signal generated in converter 13 to the intermediate frequency amplifier 33, and variations in the capacity of capacitor pickup 60 in accordance with the recorded sound information cause corresponding variations in the coupling coefficient between windings 29 and 31 since the mutual inductance between the windings is cancelled to a greater or lesser extent by the capacity pickup as its capacity varies. The intermediate frequency signal from the converter is therefore amplitude modulated, amplified in the intermediate frequency amplifier 33, and detected and amplified by the subsequent stages of the receiver in the same manner as were the radio signals. As previously discussed, the capacity pickup, aided if necessary by capacitor 67, may operate in the C region of Fig. 1 so that the AGC developed in the receiver opposes rather than aids the spurious modulation due to eccentricity of the phonograph record.

Figure 3:
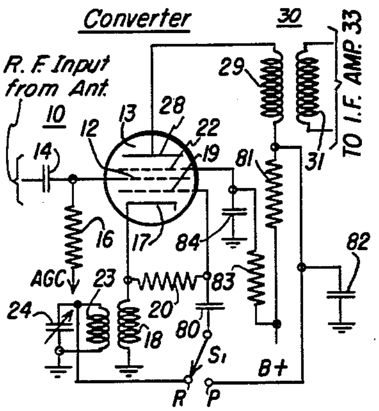
Fig. 3 is a modification of the converter stage of the receiver of Fig. 1.

In the modification of Fig. 3, the receiver is further simplified since the mixer section of the converter stage is used as an oscillator for phonograph reproduction, and the heterodyne oscillator is disabled obviating the need for any extra capacitive or inductive elements in the heterodyne oscillator. The frequency determing network 23, 24 is coupled to control electrode 19 through a coupling capacitor 80 instead of by way of the coil 21 of Fig. 2. Switch $S_1$ is connected so that in its "R" position network 23, 24 is connected to capacitor 80, but in its "P" position the bottom of winding 29 of transformer 30 is connected to the capacitor 80.

In order to provide a feedback potential to control electrode 19 when switch $S_1$ is in its "P" position, winding 29 is connected to B+ through a resistor 81 which is bypassed by a capacitor 82 connected to B−, and to provide the appropriate operating potential to screen 22, the screen is connected to B+ through a resistor 83 and bypassed to B− through a capacitor 84.

Therefore, when switch $S_1$ is in its "R" position, the converter operates in its usual manner and develops a heterodyne signal which is mixed with the incoming radio signal to impress an intermediate frequency signal across winding 29. However, when switch $S_1$ is placed in its "P" position, the heterodyne mixer section of the converter is converted into an oscillator and, since winding 29 is tuned to the intermediate frequency, the resulting oscillator develops the desired intermediate frequency oscillation for amplitude modulation in the previously described manner. Therefore, by the simple inclusion of switch $S_1$, the converter stage of the receiver may be conditioned for radio reception or switched to an oscillator circuit which immediately generates the desired intermediate frequency signal.

The invention provides, therefore, an improved radio-phonograph in which a capacity pickup is used in an improved and simplified manner to amplitude modulate a carrier signal developed in the receiver in accordance with recorded information.

More generally the invention provides an improved means for controlling the amplitude of a carrier wave in accordance with capacity variations of a capacitive element. The capacitive element may be a capacity microphone so that a developed carrier may be amplitude modulated in accordance with an audio signal in a radio or telephone transmitter. Moreover, the teachings of the invention may be applied to tape or film reproduction. In addition the capacity element may be manually adjustable to constitute a volume control.

Therefore, while particular embodiments of the invention have been shown and described, modifications may be made, and it is intended in the appended claims to cover all such modifications as fall within the true spirit and scope of the invention.

We claim:

1. A signal modulating system including in combination, a circuit for producing a signal having a selected frequency, a circuit for utilizing said signal, a coupling transformer for coupling said first-mentioned circuit to said second-mentioned circuit, said coupling transformer having a given mutual inductance providing inductive coupling thereacross, and a capacitive modulating element bridged across said coupling transformer to vary the coupling coefficient thereof and control the amplitude of the aforesaid signal as applied to said second-mentioned circuit in accordance with capacity variations of said element, said capacitive modulating element providing capacitive coupling across said transformer, with the same one of said capacitive and inductive couplings predominating at said selected frequency throughout all of said capacity variations.

2. In a superheterodyne wave signal receiver which includes an input circuit for selectively tuning the receiver to selected signals in a predetermined frequency band, a frequency converter stage including a heterodyne oscillator for converting the aforesaid selected signals from said input circuit to an intermediate frequency signal of a selected frequency, and an amplitude modulation detector, the combination with the aforesaid elements of a circuit for coupling sad converter to said detector including a pair of inductively coupled resonant circuits tuned to the aforesaid selected frequency of said intermediate frequency signal, the inductive coupling of said resonant circuits including a given mutual inductance providing inductive coupling, means for selectively causing said converter to generate an intermediate frequency signal of the aforesaid selected frequency, and capacitor means including a variable capacitive transducer element bridged from one of the aforesaid resonant circuits to the other to vary the coupling coefficient therebetween and control the amplitude of the last mentioned intermediate frequency signal as applied to the aforesaid detector in accordance with capacity variations of said element, said capacitor means providing capacitive coupling between said resonant circuits, with the same one of said capacitive and inductive couplings predominating at said selected frequency throughout all variations of said capacitive transducer element, whereby amplitude variation of the intermediate frequency signal according to variations of said capacitive transducer element may be derived in the amplitude modulation detector.

3. In a superheterodyne wave signal receiver which includes an input circuit for selectively tuning the receiver to selected signals in a predetermined frequency band, a frequency converter stage including a heterodyne oscillator for converting the aforesaid selected signals from said input circuit to an intermediate frequency signal of a selected frequency, and an amplitude modulation detector, the combination with the aforesaid elements of a circuit for coupling said converter to said detector including a coupling transformer having a primary winding and a secondary winding intercoupled by a given mutual inductance, means for selectively causing said converter to generate an intermediate frequency signal of the aforesaid selected frequency, and capacitor means including a variable capacitive transducer bridged across said primary and secondary windings of said coupling transformer to control the amplitude of the last mentioned intermediate frequency signal as applied to the aforesaid detector in accordance with capacity variations of said element, said capacitor means and said mutual inductance being selected to provide capacitive coupling across said transformer throughout all variations of said transducer whereby amplitude variations of the intermediate frequency signal according to variations of said transducer may be derived in the amplitude modulation detector.

4. In a superheterodyne wave signal receiver which includes an input circuit for selectively tuning the receiver to selected signals in a predetermined frequency band, a frequency converter stage for converting the aforesaid selected signals from said input circuit to an intermediate frequency signal of a selected frequency, a heterodyne oscillator included in said converter having a frequency-determining network, and an amplitude modulation detector, the combination with the aforesaid elements of a circuit for coupling said converter to said detector including a coupling transformer having a primary winding and a secondary winding, said primary winding and said secondary winding having a given mutual inductance to provide inductive coupling therebetween, reactive impedance means, means for selectively switching said impedance means in said frequency determining network of said heterodyne oscillator to cause said converter to develop an intermediate frequency signal of the aforesaid selected frequency, and capacitor means including a variable capacitive element bridged across said primary and secondary windings of said coupling transformer to control the amplitude of the last mentioned intermediate frequency signal in accordance with capacity variations of said element, said capacitor means providing capacitive coupling in said transformer, with the same one of said capacitive and inductive couplings predominating at said selected frequency throughout all variations of said variable capacitive element whereby amplitude modulation of the intermediate frequency signal by said element may be derived in the amplitude modulation detector.

5. A superheterodyne wave signal receiver including in combination, an input circuit for selectively tuning the receiver to selected signals, a heterodyne oscillator and mixer for developing a heterodyne signal of a variable frequency and for producing an intermediate frequency signal of a selected frequency in response to said selected signals from said input circuit and said heterodyne signal from said oscillator, an output circuit for said mixer including a resonant coupling network tuned to the aforesaid selected frequency of said intermediate frequency signal, amplitude modulation detection means including winding means having inductive coupling to said resonant coupling network, capacitor means including a variable capacitive phono pick-up intercoupling said winding means and said resonant coupling network, said capacitor means providing capacitive coupling between said winding means, with the same one of said capacitive and inductive couplings predominating at said selected frequency throughout all variations of said phono pick-up, and switching means for connecting said heterodyne oscillator to said mixer and for alternately connecting said resonant coupling network in an oscillatory relation with said mixer to generate a signal of the aforesaid intermediate frequency.

6. A superheterodyne wave signal receiver including in combinaton, an electron discharge device including an anode, a cathode and a plurality of control electrodes, an input circuit coupled between one of said control electrodes and a point of reference potential, a heterodyne oscillator circuit including a frequency-determining network coupled to said cathode and having one side connected to said point of reference potential, an output circuit including a resonant network tuned to a selected frequency and having one side connected to said anode, and a switching means for selectively connecting the other side of said frequency-determining network and the other side of said resonant network to a further control electrode of said electron discharge device.

7. In a superheterodyne wave signal receiver which includes an input circuit for selectively tuning the receiver to selected signals in a predetermined frequency band, a frequency converter stage including a heterodyne oscillator for converting the aforesaid selected signals from said input circuit to an intermediate frequency signal of a selected frequency, an amplitude modulation detector, and an automatic gain control circuit for controlling the gain of the receiver as an inverse function of the intensity of the aforesaid intermediate frequency signal, the combination with the aforesaid elements of a circuit controlled by the automatic gain control circuit and adapted to translate the intermediate frequency signal from said converter to said detector including a pair of inductively coupled resonant circuits tuned to the aforesaid selected frequency of said intermediate frequency signal, means for selectively causing said converter to generate an intermediate frequency signal of the aforesaid selected frequency, and capacitor means including a capacitive phono pick-up element having a capacity in excess of that necessary to cancel the inductive coupling between said resonant circuits bridged from one of said resonant circuits to the other to vary the coupling coefficient therebetween and control the amplitude of the last mentioned intermediate frequency signal as applied to the aforesaid detector in accordance with capacity variations of said element.

8. In a superheterodyne wave signal receiver which includes an input circuit for selectively tuning the receiver to selected signals in a predetermined frequency band, a frequency converter stage including a heterodyne oscillator for converting the aforesaid selected signals from said input circuit to an intermediate frequency signal of a selected frequency, and an amplitude modulation detector, the combination with the aforesaid elements of a circuit for translating the intermediate frequency signal from said converter to said detector including a pair of inductance coils intercoupled by a mutual inductance providing inductive coupling and each having one side couped to a point of reference potential at the selected frequency, means for selectively causing the aforesaid converter to develop an intermediate frequency signal of the aforestaid selected frequency, capacitor means bridging said inductance coils to provide capacitive coupling, with the same one of said capacitive and inductive couplings predominating at said selected frequency said capacitor means including a capacity pickup having a pair of leads connected thereto with each of said leads having a shield coupled to said point of reference potential and each lead exhibiting capacity between such lead and its corresponding shield, means for coupling one of said leads to the other side of one of said inductance coils, and a switching device having a movable arm connected to the other side of the other of said inductance coils and having one contact connected to the other of the aforesaid leads, whereby the capacity between said leads and their corresponding shields contributes to tune said inductance coils respectively to the aforesaid selected frequency.

9. In a superheterodyne wave signal receiver which includes an input circuit for selectively tuning the receiver to selected signals in a predetermined frequency band, a frequency converter stage including a heterodyne oscillator for converting the aforesaid selected signals from said input circuit to an intermediate frequency signal of a selected frequency, and an intermediate frequency amplifier, the combination with the aforesaid elements of a circuit for coupling the converter to the intermediate frequency amplifier including a transformer having a primary winding and a secondary winding with given mutual inductance providing inductive coupling therebetween, said secondary winding being shunted by a pair of series-connected capacitors, means for connecting the common junction of said capacitors to the aforesaid intermediate frequency amplifier, means for selectively causing the aforesaid converter to generate an intermediate frequency signal of the aforesaid selected frequency, capacity phono pickup means having a pair of leads connected thereto, means for coupling one of said leads to one side of said primary winding, and a switching device having a movable arm connected to one side of said secondary winding and having a first contact connected to the other of the aforesaid leads, said switching device further having a second contact connected to the aforesaid common junction of said capacitors for operatively coupling said capacity means into the receiver and removing the same therefrom for radio signal reception, said capacity means providing capacitive coupling, with the same one of said capacitive and inductive couplings predominating at said selected frequency throughout all variations of said capacitive phono pickup means.

10. In a superheterodyne wave signal receiver which includes an input circuit for selectively tuning the receiver to selected signals in a predetermined frequency band, a frequency converter stage including a heterodyne oscillator for converting the aforesaid selected signals from said input circuit to an intermediate frequency signal of a selected frequency, an intermediate frequency amplifier, and an automatic gain control circuit, the combination with the aforesaid elements of a circuit for coupling the converter to the intermediate-frequency amplifier including a transformer having a primary winding and a secondary winding intercoupled by mutual inductance providing inductive coupling, said secondary winding having one side connected to said automatic gain control circuit, means for selectively causing the aforesaid converter to develop an intermediate frequency signal of the aforesaid selected frequency, capacitor means including a capacity pickup having a pair of leads connected thereto, means for coupling one of said leads to one side of said primary winding, a resistor having one side connected to a point of reference potential, and a switching device having a movable arm connected to the other side of said secondary winding and having a first contact connected to the intermediate frequency amplifier, said switching device further having a second contact connected to the other side of said resistor and the other of the aforesaid leads, said capacitor means providing capacitive coupling sufficient to cancel said inductive coupling and provide capacitive coupling throughout all variations of said capacity pick-up.

11. The combination of claim 4 wherein said reactive impedance means is a tuned circuit tuned to the selected frequency.

References Cited in the file of this patent

UNITED STATES PATENTS

| | | |
|---|---|---|
| 2,047,726 | Di Renzo | July 14, 1936 |
| 2,436,946 | Tatro | Mar. 2, 1948 |
| 2,505,655 | Van Weel | Apr. 25, 1950 |